Patented Sept. 20, 1932

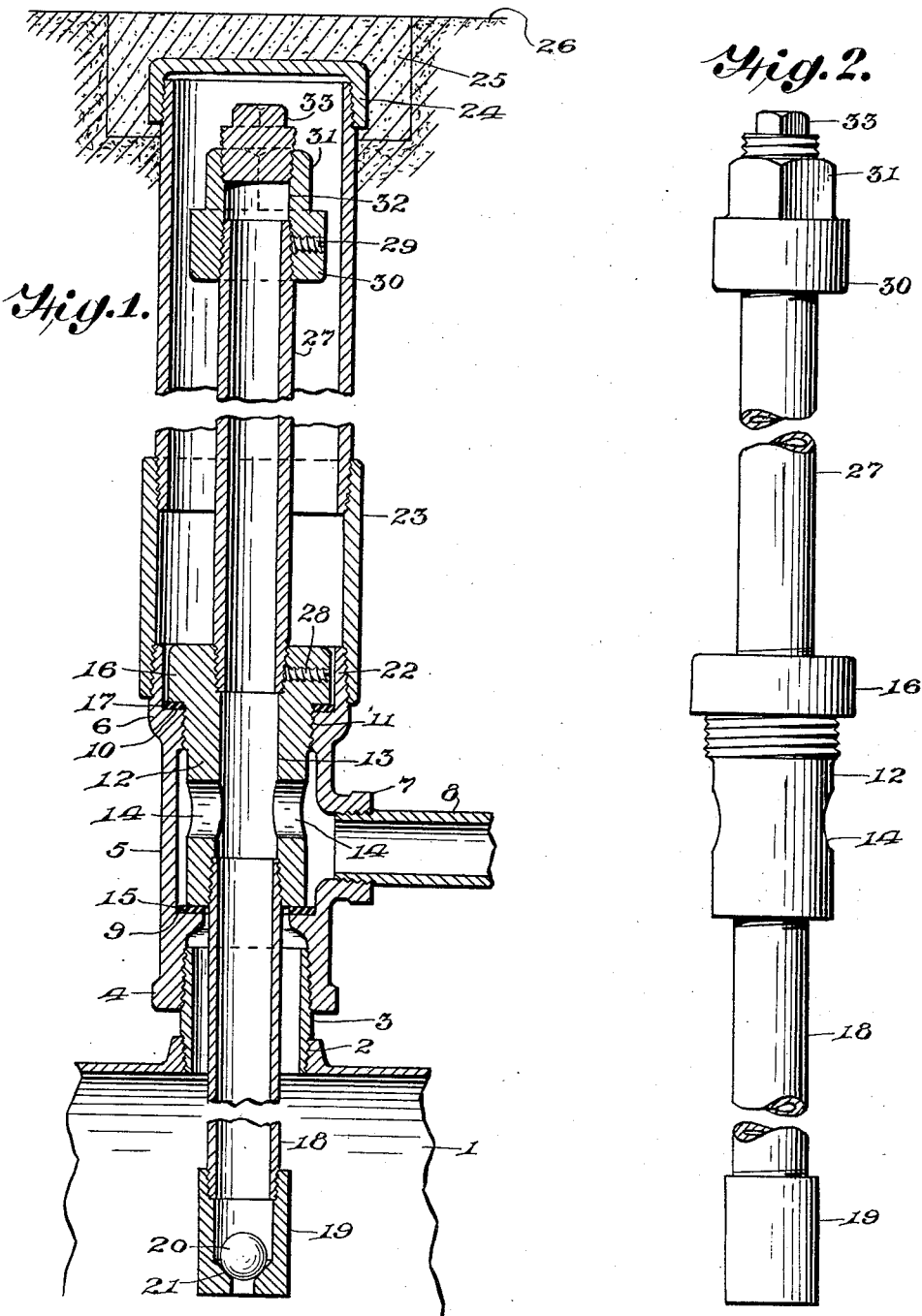

1,878,834

UNITED STATES PATENT OFFICE

HARRY FALTERMAYER, OF PHILADELPHIA, PENNSYLVANIA

PIPE LINE CONNECTION FOR TANKS

Application filed September 11, 1930. Serial No. 481,333.

The object of the invention is to provide improvements in the means whereby a pipe line is connected to tanks containing liquids, and is particularly adapted for use in connecting a suction line to a tank containing liquid fuel or other substances.

The need for the present device has arisen largely with the rapid increase in the use of fuel oil, though it is to be understood that it may be used equally well in connection with gasoline and other tank installations, and in each instance provides for the ready removal, replacement, or repair, of the valve or other parts, which heretofore have been relatively inaccessible.

Particularly in the use of fuel oils, there is generally present a certain amount of foreign matter, either in the form of solid particles or of heavier residue and gummy substances. These tend in time to accumulate within and about the immersed check valve, which is usually of the ball or disc type, so that the movable part inclines to a stick either in closed or open position, thus defeating its purpose and preventing the oil burner, pump, or other mechanism, from operating automatically.

Another object has therefore been to provide in such cases, a support for the check valve, which can be removed by a person at a substantial distance from the tank and repaired and replaced in operative position, without necessitating access to the tank, which is in almost every instance deeply buried and frequently covered by concrete or cement, in order to minimize the fire hazard.

With the objects of the invention thus broadly stated, the invention comprises further details of construction and operation, which are fully brought out in the following description, when read in conjunction with the accompanying drawing, in which Fig. 1 is a vertical section through a device comprising one embodiment of the invention, and Fig. 2 is an elevational view of the valve-supporting stem per se.

Referring to the drawing, a portion only of a tank 1 is shown as being provided with a threaded aperture 2, in which a nipple 3 is secured, the opposite end of said nipple being secured to and in communication with one end 4 of a T-shaped fitting 5.

Said fitting also comprises an opposite end 6, and an intermediate apertured connection boss 7, to which a suction pipe 8 may be attached. Within said fitting there are provided annular shoulders 9 and 10, upon the opposite sides of said intermediate connection, while the inner wall of said fitting is threaded at 11.

A member 12, having a bore 13 and one or more lateral apertures 14, is provided with an outer threaded portion in normal engagement with the threaded portion 11 of said T-shaped fitting. When firmly secured in normal position within said fitting, the lower end of said member engages the first shoulder 9 through a gasket 15, while the under surface of a flange 16, carried by the upper portion of said member, engages the second shoulder 10 through a gasket 17.

The central portion of said fitting, being of substantially larger diameter than the outer surface of said member, liquids can readily flow through any and all of the apertures in the latter and thence towards and through the lateral aperture in the former. Said member also supports from its lower end portion an exhaust pipe 18, which extends freely through the nipple 3 and aperture 2, and upon its lower free end carries any desired type of check valve 19, in this instance embodying a ball 20 adapted to engage a seat 21.

Normally fixed to the upper end portion of the T-shaped fitting 14, preferably by means of a threaded flange 22, is a preferably tubular casing 23, which may be of any desired length and has its upper or free end normally closed by means of a cap or the like 24. This cap may be exposed above the ground level, if the tank 1 lies therebeneath, as in the case of the usual gasoline station tank, or when said tank is buried beneath the floor of and within a building, said cap may be covered with a light layer 25 of cement or the like, which may but need not form a continuation of the surrounding flooring 26.

To the upper end portion of the member 12 and preferably in alignment with the bore 13 a tubular extension 27 is secured, in this case by means of a lock screw 28, said extension proceeding through and towards the upper end of said casing 23, and upon its upper end there being secured to it at 29 an annular terminal member 30, provided externally with a polygonal wrench-engaging surface 31, and with a bore 32 in alignment with that of said extension and normally closed by a detachable plug or the like 33, which is closely adjacent to the free end of said casing.

In the operation of this device, the parts are normally arranged as shown in the drawing, with a suction pump of any suitable type connected to the pipe 8. When such pump draws liquid from within the tank, the ball 20 is free to lift from its seat, returning thereto when such withdrawal ceases, and thus preventing liquid within the suction and exhaust pipes from receding into the tank. However, after frequent use, residue and foreign matter tends to accumulate between the ball and seat and in time either prevents said ball from lifting, or prevents it from falling again upon said seat. In such cases at present the exhaust pipe is very difficult of access, and generally it is necessary to dig up the ground above the tank with disruption of whatever may be in the way.

However, with the present construction, if the casing closure is exposed, it is only necessary to remove the same, and then remove the plug 33 for application of a suction hose, if the ball is merely to be freed from its seat, and a serious accumulation of sediment, residue, or general foreign matter is not present. If the casing closure is covered as in Fig. 1, only a small portion of such covering need be removed in order to expose it and permit its removal.

In cases where there is a serious clogging or inoperativeness of the check valve, upon the removal of the casing cap, a wrench may be employed to grip the terminal member 30 and turn the same, thereby loosening and permitting the withdrawal of the bored member 12 from the T-shaped fitting 5, together with the exhaust pipe 18 and check valve 19, all secured together to form a unit, illustrated per se in Fig. 2. Upon cleaning these parts or repairing them, the renovated unit may be replaced by inserting it through the casing and attachment to the T-shaped fitting by rotating the terminal member in the opposite direction, making certain that airtight joints are created by and at the gaskets 15 and 17.

Another advantage of the present device lies in the fact that, when positioned between a tank and a suction pump, as for instance the pump in an oil burner, said device facilitates the priming of the line between tank and pump, especially when the tank or at least said device is situated above the elevation of the pump. It is a well-known fact that a pump will not draw liquid from a tank if there is air or gas in any portion of the line, so that there must be uninterrupted liquid from the surface of the liquid within the tank into the pump. If for any reason the continuity of the liquid is broken (or before it is originally established), it must be restored by injecting additional liquid into the line in such quantity and at such location as to accomplish the desired result, and if the tank or at least the connection of the lead line therewith is above the pump and air enters the line, as by the normal accumulation from the usual run of liquids, an air pocket forms in the highest part of such line. To pour liquid into an opening in the pump which is lower would do no good, and so it is today (in the absence of the present device) necessary to disconnect the lead pipe 8 from the tank and fill both of said lead and exhaust pipes, before reconnecting the same, and this must be repeated as air and gas again accumulate in the line. Consequently, it will be seen at once that the present device offers a most simple, rapid and efficient means for priming the line, by simply removing the casing cap 24 and plug 33, pouring in sufficient liquid to fill both lead and exhaust pipes, and replacing both plug and cap. Furthermore, by filling the tubular extension 27 to or near the top before replacing the plug, said extension serves as a reservoir and maintains the active parts of the line full at all times, even as air and gas rise and accumulate in such extension, and in fact until the level of the liquid therein and in said line falls substantially below the lateral opening in the apertured boss 7 of the T-fitting.

Having thus described my invention, what I claim and desire to protect by Letters Patent of the United States is:—

1. The combination of a tank having an aperture, a T-shaped pipe fitting connected to said aperture, an axially bored and radially apertured member removably supported within said fitting, an exhaust pipe supported by said member and extending through said aperture, a pipe rigidly secured to said member independently of said fitting and extending freely therefrom, and a removable closure for said last-named pipe.

2. The combination of a tank having an aperture, a T-shaped pipe fitting connected to said aperture, an axially bored and radially apertured member removably supported within said fitting, an exhaust pipe supported by said member and extending through said aperture, and a removable closure for the end of the bore in said member opposite to said exhaust pipe.

3. The combination of a tank having an aperture, a T-shaped pipe fitting connected to said aperture, an axially bored and radially apertured member within and in fluid-tight connection with said fitting, an exhaust pipe supported by said member in communication with one end of its bore and extending through said aperture into said tank, a pipe fixedly secured to said member and communicating with the opposite end of its bore, and a removable closure for said last-named pipe.

4. The combination of a tank having an aperture, a T-shaped pipe fitting connected to said aperture, an axially bored and radially apertured member within and in fluid-tight connection with said fitting, an exhaust pipe supported by said member in communication with one end of its bore, a check valve carried by said exhaust pipe, a pipe fixedly secured to said member and communicating with the opposite end of its bore, and a removable closure for said last-named pipe, rotation of said last-named pipe operating to disconnect said member from and permit its withdrawal from said fitting and the withdrawal of said check valve from within said tank through said fitting.

5. The combination of a tank having an aperture, a T-shaped pipe fitting normally fixed thereto in communication with said aperture, a longitudinally bored and radially apertured member extending within said fitting and in fluid-tight connection therewith upon the opposite sides of the lateral opening of said fitting, an exhaust pipe fixed to and communicating with one end of the bore of said member and normally extending through said aperture into said tank, a tubular extension fixedly secured to said member and communicating with the opposite end of the bore of said member, and a closure for the free end of said extension.

6. The combination of a tank having an aperture, a T-shaped pipe fitting normally fixed thereto in communication with said aperture, a longitudinally bored and radially apertured member extending within said fitting and in fluid-tight connection therewith upon the opposite sides of the lateral opening of said fitting, an exhaust pipe fixed to and communicating with one end of the bore of said member and normally extending through said aperture into said tank, a tubular extension fixedly secured to said member and communicating with the opposite end of the bore of said member, a closure for the free end of said extension, and a fitting secured to said extension and manually engageable to permit separation of said member from and the withdrawal of said exhaust pipe from said tank through said T-shaped fitting.

7. The combination of a tank having an aperture, a T-shaped pipe fitting normally fixed thereto in communication with said aperture, a longitudinally bored and radially apertured member extending within said fitting and in fluid-tight connection therewith upon the opposite sides of the lateral opening of said fitting, an exhaust pipe fixed to and communicating with one end of the bore of said member and normally extending through said aperture into said tank, a tubular extension fixedly secured to said member and communicating with the opposite end of the bore of said member, a closure for the free end of said extension, and a casing also secured to said T-shaped fitting in spaced relation with and normally inclosing said extension.

8. The combination of a tank having an aperture, a T-shaped pipe fitting normally fixed thereto in communication with said aperture, a longitudinally bored and radially apertured member extending within said fitting and in fluid-tight connection therewith upon the opposite sides of the lateral opening of said fitting, an exhaust pipe fixed to and communicating with one end of the bore of said member and normally extending through said aperture into said tank, a tubular extension fixedly secured to said member and communicating with the opposite end of the bore of said member, a closure for the free end of said extension, a polygonal wrench-engagable fitting secured to said extension to permit separation of said member from and the withdrawal of said exhaust pipe through said T-shaped fitting, a tubular casing also secured to said T-shaped fitting in spaced relation with and surrounding said extension, and a removable closure for said casing.

In testimony whereof I have affixed my signature.

HARRY FALTERMAYER.